J. R. HYDE.
Cooking-Stove.
No. 6,389.
Reissued April 20, 1875.
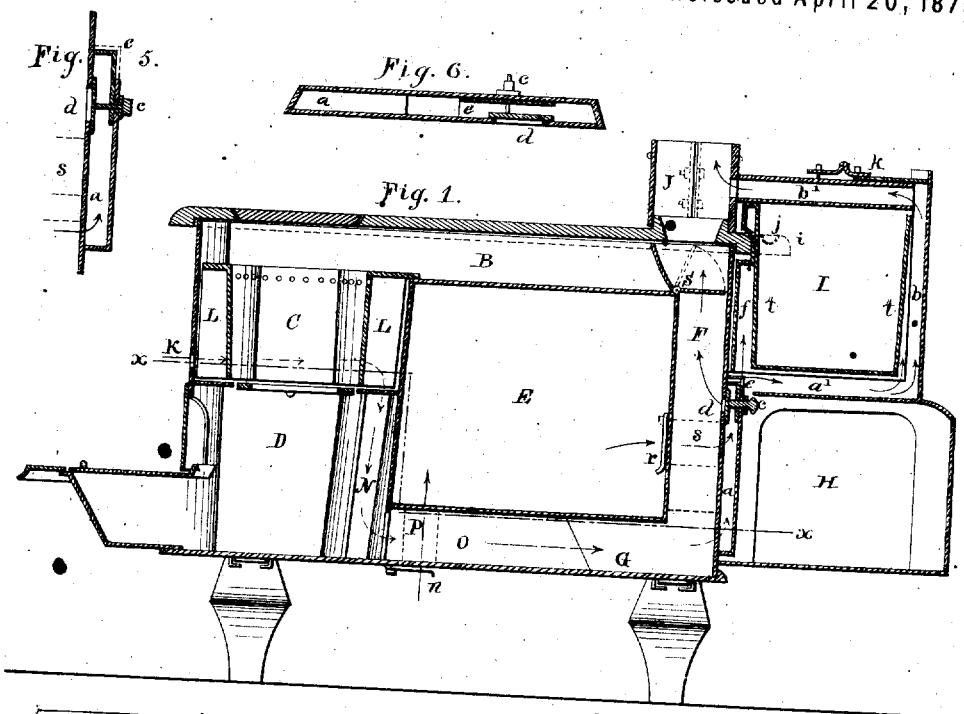
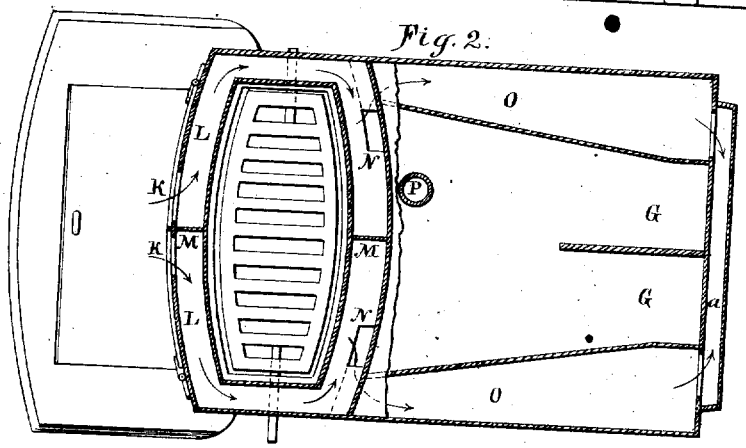
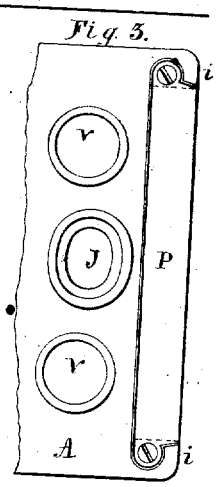
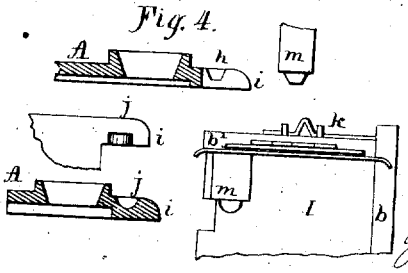
WITNESSES:
A. A. Felch.
Alexander Scott
INVENTOR.
James R. Hyde
by P. J. Green Atty
THE GRAPHIC CO. PHOTO-LITH. 39 & 41 PARK PLACE, N.Y.

UNITED STATES PATENT OFFICE.

JAMES R. HYDE, OF TROY, NEW YORK.

IMPROVEMENT IN COOKING-STOVES.

Specification forming part of Letters Patent No. 150,048, dated April 21, 1874; reissue No. 6,389, dated April 20, 1875; application filed March 23, 1875.

*To all whom it may concern:*

Be it known that I, JAMES R. HYDE, of the city of Troy, in the county of Rensselaer and State of New York, have invented certain Improvements in Cooking-Stoves, Water-Reservoirs, and Warming-Closets, of which the following is a specification:

The nature of my invention relates to improvements in cooking-stoves, water-reservoirs, and warming-closets, and their combinations, reference being had to Letters Patents granted to me for improvements in cooking-stoves and water-reservoirs, dated, respectively, March 11, 1873, and June 17, 1873; and it consists in constructing an air-chamber on the sides and ends of the fire-box, divided into two parts by vertical partition-plates in front and rear of said fire-box. Into this chamber air from the room is admitted, either in front and at each side of the partition-plate, or from the bottom of the stove, through flues or ducts placed near the front corners in such stove, to and into the aforesaid air-chamber. The air thus admitted becomes highly heated by the fire in the fire-box, and passes therefrom, through flues at the back side of said fire-box and in front of the oven, from near the partition-plate, obliquely to the outside horizontal flues under the oven; thence along said flues to a vertical flue in rear of the ascending and descending smoke-flues; thence upward in said flue to the reservoir, where it is diffused about said reservoir, between the tank and outside walls thereof, and through flues on the bottom, up the back, and over the top of said reservoir, to and into the smoke-pipe. Such heated air may be let into the smoke-flue at the lower part of the reservoir, or into the room at the top of the reservoir, or through an opening in the back plate of such stove, when the reservoir is dispensed with, by the use of movable valves. It also consists in the construction and arrangement of the flues in such a manner that the air that is heated in the heating chamber or space around the fire-box, or between the oven and said fire-box, is utilized to impart additional heat to the oven, and to effectually heat the reservoir and warming-closet, and the room where such stove is situated, or an upper room, by a connecting-pipe attached to the flue over the reservoir. It also consists in a stove with an incased reservoir attached thereto, which has a space or spaces between the tank or lining and the outside walls thereof, and which reservoir is heated by air first heated in such stove, and passed thence, through flues or flue or opening in such stove, to and about such reservoir-tank, and into the smoke flue or pipe of such stove. It also consists in the construction and arrangement of a reservoir and warming-closet, mounted together, so as to be attached to, or detached from, such stove whenever it may be desirable, without the use of bolts or screws. It further consists in the employment of a valved connecting pipe or flue from the stove-bottom to the oven, to admit air from the room into the oven; also, a valve in the back oven-plate, and a connecting tube or flue from the oven to the hot-air flue in rear of the smoke-flues, or to and into the space or flue or flues, or both, about the reservoir tank or lining, for the purpose of ventilating the oven, and for supplying additional heat to be applied to the reservoir and room where such stove is situated, or for heating an upper room, all of which is hereinafter more fully described, reference being had to the drawings and letters of reference marked thereon, making a part of this specification.

Figure 1 is a longitudinal vertical sectional view of my stove, reservoir, and warming-closet. Fig. 2 is a plan view of such stove, taken at *x x*, Fig. 1, as shown by the dotted lines, with a part of the fire-chamber and a part of the oven removed, showing the flues under the oven, and the hot-air flue at the rear of the stove. Fig. 3 is a plan view of the rear part of the stove-top A, showing the piece P in position when the reservoir is removed. Fig. 4 are sectional views of parts of the top plate A and part of the reservoir, showing the manner of attaching the reservoir and warming-closet to the stove. Fig. 5 is a vertical sectional view of the hot-air flue or chamber at the rear end of the stove, showing the valves therein. Fig. 6 is a longitudinal cross-section of the same hot-air flue or chamber, showing the valves or dampers.

Like letters refer to like or corresponding parts in all the drawings or figures.

A represents the boiler-hole top of a cooking-stove, made in any of the known ways, except as hereinafter stated. B represents the flue-space over the oven; S, the damper; F, the common descending and ascending rear smoke-flues; G, the smoke-flues under the oven, (this is a two-flue stove; but three flues may be used, if desired;) C, the fire-box; D, the ash-pit; E, the oven; I, the reservoir; H, the warming-closet. Around the fire-box C is formed an air-chamber, L, extending entirely around the same, and provided with two vertical partitions, M, as shown in Fig. 2, so as to form two apartments. Cold air is admitted into this chamber through flues or tubes extending from the stove-bottom to said chamber L, and at or near the front corners of said stove, or through the front plate of such stove, and on each side of the front partition-plate M, as shown at K, Fig. 2. These inlets for cold air should be provided with valves, so as to regulate the quantity of air to be admitted. The air admitted into this chamber or space L becomes highly heated, and passes (as indicated by the arrows in Figs. 1 and 2) around the fire-box, and down through the flues N, which lead obliquely from near the rear partition M in said heating-chamber to the side bottom flues O, Fig. 2, and along said flues to and through openings in the rear end plate of the stove into the hot-air chamber or flue *a*, Figs. 1, 2, 5, and 6. This flue *a* extends nearly from side to side of the stove, and from the bottom of the stove up to the bottom of the reservoir-tank. Said flue *a* has an opening, *d*, into the smoke-flue F; also an opening, *e*, in the back plate of the stove, and which connects with the flue *a'* under the reservoir tank or lining *t;* also with spaces *f* by the sides and ends of such tank or lining *t*. The openings *d* and *e* in the flue *a* are provided with movable dampers or valves, as shown in Figs. 1, 5, and 6, and are so constructed that when the opening or valve *d* is open, the valve *e* will be closed, and the current of heated air will pass into the smoke-flue F; and if the valved opening *d* is closed, the valved opening *e* will be open, and the current of heated air will pass into and through the flues *a'*, *b*, and *b'*, and into the smoke-pipe. Such heated air will also be diffused through the spaces *f* by the sides and ends of the reservoir tank or lining *t;* or, if the slide-valve *k* is moved so as to open the hole or space covered by it over the flue *b*, the heated air will be admitted into the room; or, if a pipe for that purpose be attached to the top of the flue *b* over the opening covered by the valve *k*, the heated air may be carried to an upper room for heating the same. A section of the smoke-pipe J is made in two parts and bolted together, or may be made in one piece, having an opening in the back side thereof to receive the end of the flue *b'*. When the valve *e* is open, the heated air will be diffused throughout the spaces *f* at the sides and ends of the reservoir tank or lining *t*, as well as through the flues *a'*, *b*, and *b'*. This tank or lining *t* is a little the smallest at the bottom, and the whole is so made that a space is formed on the sides and ends, between the tank or lining *t* and the outside wall of the reservoir; the space *f*, that is next the stove, is some the largest. The valves *e* and *d* are made to slide horizontally, and are attached together by the knob *c*, and so formed that when one is open the other is closed, although they may be made to open and close separately. When the reservoir and warming-closet are not attached to the stove, the heated air may be used to warm the room by opening the valve *e*, or it may be turned into the smoke-flue F by closing the valve *e* and opening the valve *d*. Fig. 3 is a view of a part of the stove-top A, having a piece, P, fitted and fastened therein to make a finish to said stove-top when the reservoir and warming-closet are not used. The dotted lines, Fig. 3, show the projecting parts *i* of the stove-top A, and between which the reservoir is fitted. The reservoir and warming-closet are mounted together, so as to form but one piece, and can be readily attached to or detached from the stove.

By this arrangement a large saving in time and expense is obtained in the shipment of such stoves and combined reservoir and warming-closet; also in setting them up for use.

The manner of attaching the reservoir and warming-closet to the stove is by extending or projecting a portion of the top A at the rear corners, as shown at *i*, Figs. 1, 3, and 4, which projections have recesses therein, either circular or beveled in form, as shown at *j* or *h*, Figs. 1 and 4. On each end, and near the front corners of the reservoir, are projecting bearing-pieces *m*, formed to fit into the recesses *j* or *h* in the extended or projecting parts *i* of the stove-top A. The reservoir and warming-closet are suspended at and against the rear end or side of such stove by the bearing-pieces *m*, which fit into the recesses *j* in the stove-top A, and will be thereby held firmly in position without the use of bolts, screws, hooks, or slots through the stove-top. *v* are openings in the stove-top, through which to clean out the flues F.

There is a duct, P, leading from the bottom of the stove into the oven near the front part thereof, and is provided with a valve, *n*, either at its top or bottom, and is for the purpose of admitting air from the room into said oven in such quantities as may be desired. There is also a duct, *s*, leading from the back part of the oven to and into the flue *a*, and connecting with the flue *a'* and spaces *f* about the reservoir, as shown by the dotted lines, Fig. 1. Said duct *s* is provided with a valve, *r*, at the back oven-plate. These valves may be opened and closed at pleasure. The purpose of the duct *s* is to convey heated air from the oven into the flue *a*, and into the flue *a'* and spaces *f* about the reservoir.

By the use of such ducts and valves the oven may be ventilated, and the heat therein regulated when baking; also, a large amount of heated air may be supplied to the reservoir or room, or both.

By the use of the side bottom flues *o* for the passage of heated air from the heating-chamber at the fire-box to flue *a* and to the reservoir, there will be a much greater degree of heat in the oven, and especially at the oven-doors, than could be by the common two or three smoke-flues. This stove will bake or roast well in the oven if the damper S is down, so that the draft from the fire-box shall be direct to the exit-pipe.

I do not claim the heating-chamber L around the fire-box, or the inlets or ducts for the admission of air therein, or the division-plates therein, separately, or as claimed in the Letters Patent granted and issued to me for improvements in cooking-stoves, reservoirs, and warming-closets, bearing date March 11, 1873, and June 17, 1873. I do not claim the particular flues or valves about the reservoir, as claimed in said patents, except in new combinations or connected with new devices; but What I do claim, and desire to secure by Letters Patent, is—

1. In a cooking-stove which has a heating-chamber, L, around the fire-box, the combination of the oblique flues N, connected with two flues, O, located under the oven externally to the smoke-flues G, and the hot-air chamber or flue *a* in the rear of the descending and ascending smoke-flues F, and the valves *e* and *d*, substantially as and for the purposes described and set forth.

2. In a cooking-stove which has a heating-chamber, L, the hot-air flues N, connected with the flues O, located under the oven, and next to the outside of the stove, the chamber or flue *a*, having the valves *e* and *d*, in combination with the ordinary vertical and horizontal smoke-flues, and a water reservoir attached to the rear end of such stove, substantially as and for the purposes described and set forth.

3. In a cooking-stove which has a heating-chamber, L, around the fire-box, the flues N, O, and *a*, and valves *e* and *d*, in combination with a water-reservoir, or reservoir and warming-closet, attached at the rear end of such stove, and having the flues *a b b′*, the spaces *f*, substantially as and for the purposes described and set forth.

4. In a cooking-stove, the combination of a water-reservoir attached thereto and a connecting-duct leading from the oven into a space or flue under or about such reservoir, for the purpose of conducting heated air from such oven to, under, or about such reservoir to heat the same, substantially as and for the purposes described.

5. A cooking-stove in combination with an incased reservoir attached thereto, having the spaces *f* between the water tank or lining *t* and the outside casing thereof, and a connecting-flue from such stove to such reservoir, through which heated air may pass from such stove to, under, or about said reservoir, and into the smoke pipe or flue at the rear part of said stove, substantially as and for the purposes described and set forth.

6. The combination of the oven E, having the valved duct P, leading from the bottom of the stove into the oven, with the valved duct *s*, leading from the oven into the chamber or flue *a*, and to and into a space or flue in, under, or about a water-reservoir, substantially as and for the purposes described and set forth.

7. The oven E, having the valved duct P leading from the bottom of the stove into said oven, the valved duct *s* leading from said oven into the flue *a*, in combination with the chamber L and flues N, O, and *a*, substantially as and for the purposes described and set forth.

8. The stove-top A, provided with recesses *j* or *h* in the rear projecting parts *i*, in combination with the reservoir having the projecting bearing-pieces *m* attached thereto, whereby the combined reservoir and warming-closet are suspended at and against the rear end of the stove, substantially as and for the purposes described and set forth.

9. In combination, a cooking-stove and an incased reservoir arranged at the rear of said stove, the flue *s*, flue *a*, and the spaces *f*, the flues *b* and *b′*, and either with or without the valved opening *k* into the flue *b′*, substantially as and for the purposes described and set forth.

10. In combination, a cooking-stove having an incased reservoir attached thereto, and having a space between the water-tank and the outside casing, through which may pass a current of heated air from said stove to, under, or about said reservoir, and at will either into the smoke flue or pipe, or into the room through a valved opening at or near the top part of the reservoir, substantially as and for the purposes described.

JAMES R. HYDE.

Witnesses:

FRANK H. BRYAN,
JOHN CURLEY.